Nov. 14, 1933.　　　A. W. HINCHLIFFE　　　1,934,712

VINEGAR GENERATOR

Filed June 19, 1929

Inventor
Alfred W. Hinchliffe
By Popp & Powers
Attorneys

Patented Nov. 14, 1933

1,934,712

UNITED STATES PATENT OFFICE 1,934,712

VINEGAR GENERATOR

Alfred W. Hinchliffe, Buffalo, N. Y., assignor to Buffalo Foundry and Machine Co., Buffalo, N. Y., a corporation of New York Application June 19, 1929. Serial No. 372,065

7 Claims. (Cl. 99—17)

This invention relates to a feeding and distributing device for feeding cider to vinegar generators and more particularly to a rotating distributor which is adapted to sprinkle the alcoholic cider over the upper surface of the usual beechwood shavings in a vinegar generator, these shavings having been impregnated with bacteria.

The distributor embodying this invention is more particularly adapted for use in connection with the system for feeding vinegar generators and the like described and claimed in my co-pending application Ser. No. 371,337 filed June 17, 1929. As is well known, the continued accurate feeding of exact quantities of cider uniformly over the surface of the impregnated shavings in the vinegar generator is of prime importance in the production of good vinegar at low cost. In the large scale production of vinegar, the alcoholic cider or liquor is allowed to trickle or is sprinkled over beechwood shavings or the like which are contained in a generator and are impregnated with bacteria which convert the passing alcohol into acetic acid, and thereby convert the alcoholic cider into vinegar. The bacteria convert the alcohol at a constant rate and if too great a quantity passes through one part of the shavings in a given time, it is apparent that the excess quantity of alcohol will not be acted upon and will pass through the shavings and mix with the vinegar thereby not only effecting a loss of acetic acid but also giving the vinegar an undesirable alcoholic content.

If, on the other hand, the cider passes through another part of the beechwood shavings at too slow a rate, the bacteria act on the converted acetic acid and form carbon-dioxide and water.

It is therefore of prime importance that the flow of cider through all portions of the beechwood shavings be maintained accurately at the precise rate at which the bacteria convert the alcohol in order to secure the maximum yield of acetic acid and the best quality of vinegar, and that therefore the alcoholic vinegar should be sprinkled uniformly over the entire surface of the beechwood shavings to secure the best results.

It is therefore the principal object of this invention to provide a distributing device which sprinkles the alcoholic cider uniformly over the entire upper surface of the beechwood shavings in a vinegar generator and at a constant rate.

Another object is to provide such a device in which there is little tendency for the orifices and passages to "mother up" or become clogged by foreign matter in the cider, and in which when such occurs, the distributor is readily accessible for cleaning and does not require that the entire generator be dismantled to clean out the accumulated mother of vinegar.

Another aim is to provide a rotating distributor or sprinkler which is rotated wholly by the power of the alcoholic vinegar fed to the same so that no independent power devices are required.

A still further aim is to provide such a distributor which will function continuously to feed uniform quantities of cider and will remain in good working condition for a long period of time.

Another purpose is to provide such a distributor which is readily adaptable to vinegar generators of different sizes and which can be produced at low cost.

Another aim is to so construct the sparge or sprinkling arms that they will not sag under continuous use, which sagging would effect a greater feed of cider on one part of the beechwood shavings than at other parts.

In the accompanying drawing:—

Similar characters of reference indicate like parts in the several figures of the drawing:—

In its general organization this invention comprises a pair of horizontal sprinkling or sparge arms which are rotatably mounted in a vinegar generator and carry perforated slides in their lower sides and also are formed to provide a distributing baffle which receives the vinegar trickling through the holes in the slides and distributes it uniformly over the beechwood shavings in the generator. These slides are so mounted as to be removable endwise from the distributing or sparge arms through an opening provided in the side of the generator so that when the holes or openings in the slides mother up, the slides can be quickly removed, cleaned and replaced.

Each of the sparge arms is also made into sections so that by applying end sections of different lengths to the sparge arms, the arms are available for use in vinegar generators of different diameters. The sparge arms are rotated by a power wheel which is driven by the incoming alcoholic vinegar and discharges into the sparge arms so that the cider first operates to rotate the sparge arms and then passes into the same to be distributed uniformly over the beechwood shavings.

Figure 1:
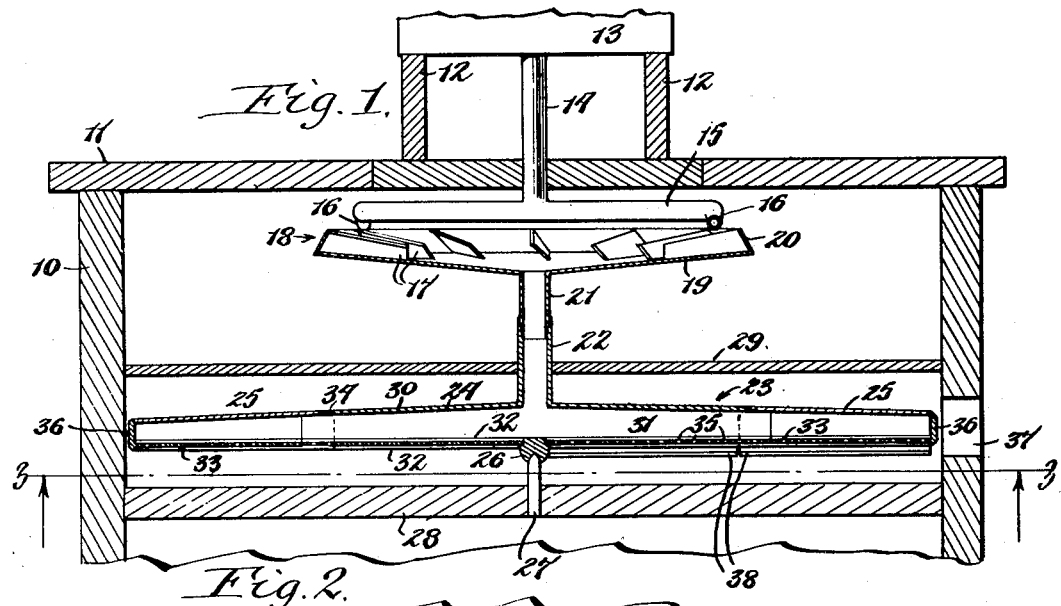
Figure 1 is a vertical section through a vinegar generator and through the cider distributor, embodying my invention.
Figure 2:
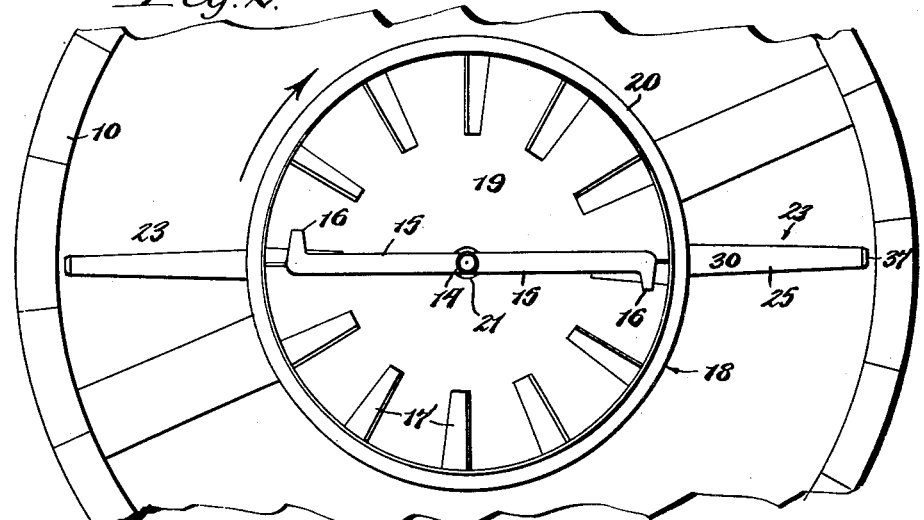
Figure 2 is a fragmentary top plan view of a vinegar generator with the cover removed and exposing the distributor embodying my invention.
Figure 3:
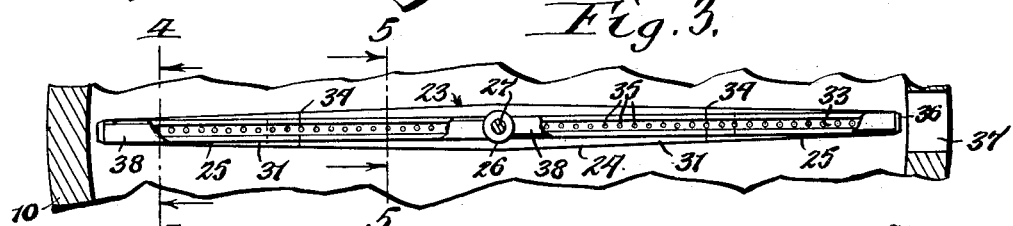
Figure 3 is a fragmentary horizontal section, taken on line 3—3 Fig. 1.

The vinegar generator is in the form of a vertical barrel or cylinder 10 which is made of the usual wooden staves and is open at its upper end. Within the generator is supported a quantity of beechwood shavings (not shown), corn cobs, coke, pumice stone or the like. The upper end of the generator is closed by a cover 11 which rests upon the upper edge of the generator and is removable therefrom. This cover carries a pair of supporting rails or bars 12 which support a dump box 13. In this dump box 13 is arranged any suitable form of dumper, which dumper receives the alcoholic vinegar in a continuous stream and when filled or unbalanced empties into the dump box 13. The alcoholic vinegar so dumped into this dump box 13 flows into a feed pipe 14, which feed pipe passes through the cover 11 of the generator, as indicated in Fig. 1.

The feed pipe 14 is formed at its lower end below the cover 11 to provide two horizontal branches or arms 15, each of which is provided at its outer end with a laterally directed power nozzle 16. These power nozzles are directed in opposite directions and discharge against fins or propeller blades 17 mounted in a horizontal power wheel, indicated generally at 18. This power wheel is composed of a downwardly dished horizontal pan 19 and side walls 20 extending upwardly from the outer edges of the pan 19, the fins or propeller blades 17 being secured to the upper side of the pan 19 and the inner side of the wall 20 in any suitable manner, and the wall 20 being inclined inwardly so as to prevent the alcoholic cider from being splashed over the sides of the wheel. At its center a depending discharge pipe 21 is formed into which the alcoholic cider flows after driving the power wheel, and which supports the power wheel. The power wheel 18 and the feed pipe 21 are preferably made of hard rubber or the like so as to resist the corrosive effects of the cider.

The discharge pipe 21 of the power wheel is tightly fitted in the upper end of a hollow shaft 22 of the distributing or sparge arms 23 and discharges the cider into the same. The sparge arms 23 are made of hard rubber or the like and comprise a central section 24 forming two arms and an end section 25 at the end of each arm 24 of the central section. The hollow shaft 22 is formed integrally with the central section 24 of the sparge arms and this central section is formed on its underside to provide an integral bearing 26. This bearing is supported on a bearing fin 27 which is carried by a cross bar 28 of the vinegar generator and the hollow shaft 22 is rotatably mounted in another cross bar 29, both of these cross bars being connected at their ends to the sides of the vinegar generator.

Figure 5:
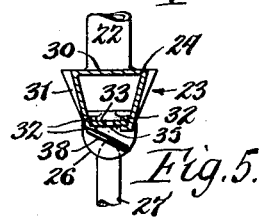
Figure 5 is a similar section taken on line 5—5, Fig. 3.
Figure 4:
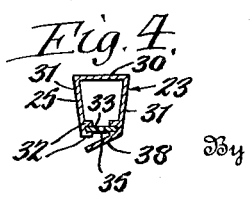
Figure 4 is a transverse section through one of the sprinkling or sparge arms, the same being taken on line 4—4 Fig. 3.

The arms 24 and their associated extensions 25 are each formed to provide a flat top 30 and side walls 31 which converge downwardly, as best shown in Figs. 4 and 5. The underside of each of these arms 24 is open and on the inner side of each of the side walls 31 beads 32 are formed, which beads form a slideway or guideway for a perforated slide 33. The extensions 25 are fitted to the arms 24 by a slip joint as indicated at 34 in Fig. 1, and the beads 32 of both the arms 24 and the extensions 25 are arranged to form a continuous guideway for the perforated slides 33, these slides being slid in from the outermost ends of the extensions 25 and terminating at the bearing 26. Each of these slides is provided with a plurality of holes 35 which are of such size and so arranged as to effect a uniform sprinkling of the cider flowing into the arms, and at their outer ends each slide is provided with an integrally formed end head 36 which closes the end of the extension 25 of each sparge arm.

The holes 35 in each slide in time become clogged with mother of vinegar or other foreign matter in the vinegar, and require cleaning at intervals. For this purpose an opening 37 is provided at one side of the vinegar generator at the same height as the arms 23. When, therefore, the holes in the slides 33 become clogged so as to interfere with the distribution of the cider over the surface of the beechwood shavings the operator turns one of the sparge arms 23 until it is in line with the opening 37 in the generator and reaches through the hole 37 and grasps the end head 36 of the slide. He can then pull the slide 33 out, clean the same, reinsert the slide in its guideway through the opening 37, and then turn the arms 23 about until the opposite sparge arm is in line with the opening when the same process can be repeated.

It will also be noted that constructing the sparge arms 23 in two sections, i. e. the arms 24 and extensions 25, the extensions 25 can be cut to the desired length and slipped on to the arms 24. By this means the same distributing mechanism can be used for any size of vinegar generator and the adaptation of the device to generators of large and small diameters is very simple and can be quickly effected. It is, of course, necessary to have the sparge arms extend substantially the full diameter of the generator to feed the entire surface. It will also be observed that by constructing the sparge arms with straight side walls 31, there is no tendency of the sparge arms to sag even after continued use. Such sagging, of course, would seriously impair the efficiency of the sparge arms since it would result in a greater feed of cider at the outer part of the shavings, and therefore defeat the primary purpose of the present invention.

It is desirable to have the holes 35 in each slide 33 as large as possible to reduce the tendency to clog up. To provide such large holes and at the same time effect a uniform distribution of the cider, inclined baffles 38 are formed integrally with the arms 24 and extensions 25 of both sparge arms. These baffles 38 extend the full length of the sparge arms and incline downwardly from the lower end of one wall 31, as best shown in Figs. 4 and 5. The cider flowing through the openings 35 therefore drops on the inclined baffles 38 and spreads out on the baffle 38 before being discharged on these wooden shavings, thereby securing a more uniform distribution of the cider on the shavings.

It is also apparent that the baffle 38 can be formed integrally with the slide 33 if so desired.

As a whole, this invention provides a very simple and effective means for distributing cider over the shavings in a vinegar generator, and will provide a uniform feed over the entire surface, thereby securing the maximum yield of acetic acid. The system is also easily cleaned, and kept in a good working condition, and will remain in a good working condition for a long period of time, the sparge arms being in particular constructed so as to avoid sagging of the same.

The distributing mechanism is also comparatively inexpensive and simple in construction and can be easily installed on vinegar generators now in use.

I claim as my invention:—

1. A vinegar generator comprising a shell adapted to contain shavings or the like, a feed pipe arranged at the upper end of said shell, a laterally extending branch pipe at the lower end of said feed pipe, a laterally directed nozzle at the outer end of said branch pipe, a power wheel comprising a horizontal downwardly dished pan, vanes arranged on the upper side of said pan and arranged in line with said nozzle whereby the cider from said nozzle revolves said pan, and an upwardly extending inwardly inclined wall at the edge of said pan, a discharge pipe at the center of said pan and a perforated distributing arm connected to said discharge pipe and rotated thereby whereby the cider from said pan is uniformly distributed over said shavings.

2. A vinegar generator comprising a shell adapted to contain shavings or the like, a sparge arm journaled for horizontal rotary movement over said shavings, said sparge arm being open at one side and being formed to provide slideways, a perforated slide removably supported in said slideways over the open side of said sparge arm and through which perforations the cider passes, means for feeding cider to said sparge arm and means for rotating said sparge arm.

3. A vinegar generator comprising a shell adapted to contain shavings or the like, a sparge arm journaled for horizontal rotary movement over said shavings, said sparge arm being open on its underside and formed to provide slideways, a perforated slide arranged in said slideways and removable endwise from said sparge arm, means for feeding cider to said sparge arm and means for rotating said sparge arm.

4. A vinegar generator comprising a shell adapted to contain shavings or the like, a sparge arm journaled for horizontal rotary movement over said shavings, said sparge arm being open on its underside and formed to provide slideways, a perforated slide arranged in said slideways and removable endwise from said sparge arm, means for feeding cider to said sparge arm and means for rotating said sparge arm, and a hole provided in the side of said shell in line with said arm and through which said slide is removable endwise from said arm and shell.

5. A vinegar generator comprising a shell adapted to contain shavings or the like, a pair of sparge arms journaled for horizontal rotary movement over said shavings, said sparge arms consisting of a central section and open ended end sections fitted to said central section, said sections being open on their undersides and being formed to provide slideways, a perforated slide fitted endwise in said slideways and enclosing the bottom of said sparge arms, heads provided at the outer ends of said slides and enclosing the open ends of said outer sections, said shell being provided with an opening in line with said arms through which said slide can be removed endwise from said arms and shell, means for feeding cider to said sparge arms and means for rotating said sparge arms.

6. A vinegar generator comprising a shell adapted to contain shavings or the like, a sparge arm journaled for horizontal rotary movement over said shavings, said sparge arm being open at one side, a perforated member fitted to said open side and through which perforations the cider passes, means for feeding cider to said sparge arm, means for rotating said sparge arm, and an inclined baffle provided on said sparge arm below said perforations and operating to distribute the cider discharged through said perforations.

7. A vinegar generator comprising a shell adapted to contain shavings or the like, a pair of sparge arms journaled for horizontal rotary movement over said shavings, said sparge arms consisting of a central section and open ended end sections fitted to said central section, said sections being open on their undersides and being formed to provide slideways, a perforated slide fitted endwise in said slideways and enclosing the bottom of said sparge arms, heads provided at the outer ends of said slides and enclosing the open ends of said outer sections, said shell being provided with an opening in line with said arms through which said slide can be removed endwise from said arms and shell, means for feeding cider to said sparge arms, means for rotating said sparge arms, and an inclined baffle extending the length of each of said arms and arranged below said perforations whereby the cider discharged from said perforations is uniformly distributed over the surface of the shavings.

ALFRED W. HINCHLIFFE.